United States Patent
Tuttle

(10) Patent No.: US 7,852,221 B2
(45) Date of Patent: Dec. 14, 2010

(54) RFID DEVICES USING RFID CIRCUITS AND ANTENNAS HAVING UNMATCHED FREQUENCY RANGES

(75) Inventor: John R. Tuttle, Boulder, CO (US)

(73) Assignee: Round Rock Research, LLC, Mount Kisco, NY (US)

( * ) Notice: Subject to any disclaimer, the term of this patent is extended or adjusted under 35 U.S.C. 154(b) by 229 days.

(21) Appl. No.: 12/117,304

(22) Filed: May 8, 2008

(65) Prior Publication Data
US 2009/0278688 A1    Nov. 12, 2009

(51) Int. Cl.
*G08B 13/14* (2006.01)
(52) U.S. Cl. ............. 340/572.2; 340/572.4; 340/572.7; 340/539.1; 340/10.1; 340/10.3
(58) Field of Classification Search ............. 340/572.2, 340/572.4, 572.7, 572.8, 539.1, 539.26, 825.69, 340/825.72, 10.1, 10.3; 235/385, 492
See application file for complete search history.

(56) References Cited

U.S. PATENT DOCUMENTS

| | | | |
|---|---|---|---|
| 3,569,976 A | 3/1971 | Korvin et al. |
| 3,733,608 A | 5/1973 | McGhay et al. |
| 3,745,568 A | 7/1973 | Works et al. |
| 3,745,569 A | 7/1973 | Works et al. |
| 4,075,632 A | 2/1978 | Baldwin et al. |
| 4,173,019 A | 10/1979 | Williams |
| 4,623,874 A | 11/1986 | Thoma |
| 4,630,044 A | 12/1986 | Polzer |
| 4,692,769 A | 9/1987 | Gegan |
| 4,926,182 A | 5/1990 | Ohta et al. |
| 4,963,887 A | 10/1990 | Kawashima |
| 5,023,866 A | 6/1991 | De Muro |
| 5,053,774 A | 10/1991 | Schuermann et al. |
| 5,081,458 A | 1/1992 | Meunier |
| 5,084,699 A | 1/1992 | DeMichele |
| 5,119,099 A | 6/1992 | Haruyama et al. |
| 5,164,985 A | 11/1992 | Nysen et al. |
| 5,182,570 A | 1/1993 | Nysen et al. |
| 5,320,561 A | 6/1994 | Cook et al. |
| 5,374,930 A | 12/1994 | Schuermann |
| 5,446,447 A | 8/1995 | Carney et al. |
| 5,448,110 A | 9/1995 | Tuttle et al. |

(Continued)

OTHER PUBLICATIONS

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004.

(Continued)

*Primary Examiner*—Hung T. Nguyen
(74) *Attorney, Agent, or Firm*—Lerner, David, Littenberg, Krumholz & Mentlik, LLP

(57) ABSTRACT

An RFID system in which RFID devices utilize RFID circuits and antennas having unmatched frequency ranges. The system includes an RFID interrogator having multiple interrogator antennas. Each interrogator antenna can be tuned to different respective frequency ranges. The system includes an RFID device having an RFID circuit, and device antennas coupled to the RFID circuit. Each device antenna can be tuned to a respective frequency range that matches only one of the interrogator antennas for communicating with the RFID interrogator according to respective protocols associated with each respective frequency range.

23 Claims, 4 Drawing Sheets

U.S. PATENT DOCUMENTS

| | | |
|---|---|---|
| 5,450,086 A | 9/1995 | Kaiser |
| 5,465,099 A | 11/1995 | Mitsui et al. |
| 5,467,099 A | 11/1995 | Bonebright et al. |
| 5,491,484 A | 2/1996 | Schuermann |
| 5,491,715 A | 2/1996 | Flaxl |
| 5,512,910 A | 4/1996 | Murakami et al. |
| 5,528,222 A | 6/1996 | Moskowitz et al. |
| 5,537,105 A | 7/1996 | Marsh et al. |
| 5,561,435 A | 10/1996 | Nalbandian et al. |
| 5,572,226 A | 11/1996 | Tuttle |
| 5,598,169 A | 1/1997 | Drabeck |
| 5,606,323 A | 2/1997 | Heinrich et al. |
| 5,617,060 A | 4/1997 | Wilson et al. |
| 5,621,412 A | 4/1997 | Sharpe et al. |
| 5,649,295 A | 7/1997 | Shober et al. |
| 5,649,296 A | 7/1997 | MacLellan et al. |
| 5,682,143 A | 10/1997 | Brady et al. |
| 5,726,630 A | 3/1998 | Marsh et al. |
| 5,771,021 A | 6/1998 | Veghte |
| 5,838,235 A | 11/1998 | Thorigne |
| 5,842,118 A | 11/1998 | Wood, Jr. |
| 5,889,478 A | 3/1999 | Minesi |
| 5,900,808 A | 5/1999 | Lebo |
| 5,923,298 A | 7/1999 | Miyahara et al. |
| 5,942,977 A | 8/1999 | Palmer et al. |
| 5,959,357 A | 9/1999 | Korman |
| 6,028,564 A | 2/2000 | Duan et al. |
| 6,037,907 A | 3/2000 | Ha et al. |
| 6,122,494 A | 9/2000 | Tuttle |
| 6,130,602 A | 10/2000 | O'Toole et al. |
| 6,177,872 B1 | 1/2001 | Kodukula et al. |
| 6,184,841 B1 | 2/2001 | Shober et al. |
| 6,192,222 B1 | 2/2001 | Greeff et al. |
| 6,239,765 B1 | 5/2001 | Johnson et al. |
| 6,243,012 B1 | 6/2001 | Shober |
| 6,317,027 B1 | 11/2001 | Watkins |
| 6,329,139 B1 | 12/2001 | Nova et al. |
| 6,329,915 B1 | 12/2001 | Brady |
| 6,356,535 B1 | 3/2002 | Smith |
| 6,362,737 B1 | 3/2002 | Rodgers et al. |
| 6,411,212 B1 | 6/2002 | Hecht et al. |
| 6,574,454 B1 | 6/2003 | Tuttle |
| 6,611,691 B1 | 8/2003 | Zhou et al. |
| 6,717,923 B1 | 4/2004 | Smith |
| 6,738,025 B2 | 5/2004 | Carrender |
| 6,825,773 B1 | 11/2004 | O'Toole et al. |
| 6,885,353 B2 | 4/2005 | Kurihara |
| 7,006,048 B2 | 2/2006 | Change |
| 7,026,935 B2 | 4/2006 | Diorio et al. |
| 7,075,901 B2 | 7/2006 | Smith |
| 7,091,860 B2 | 8/2006 | Martinez de Velasco Cortina et al. |
| 7,132,946 B2 | 11/2006 | Waldner et al. |
| 7,327,257 B2 | 2/2008 | Posamentier |
| 2004/0178912 A1 | 9/2004 | Smith |
| 2006/0202827 A1 | 9/2006 | Volpi et al. |
| 2007/0018904 A1 | 1/2007 | Smith |
| 2007/0290807 A1 | 12/2007 | Smith |
| 2009/0015407 A1 | 1/2009 | Tuttle |
| 2009/0027168 A1 | 1/2009 | Tuttle |
| 2009/0224884 A1* | 9/2009 | Tuttle ........................ 340/10.1 |
| 2009/0289771 A1 | 11/2009 | Tuttle |

OTHER PUBLICATIONS

Turner, Chris, "Backscatter Modulation of Impedance Modulated RFID Tags," located at www.rfip.eu/backscatter_tag_link_budget_and_modulation_at_reader_receiver.pdf, Feb. 2003.

Transaction History of related U.S. Appl. No. 09/020,595, filed Feb. 4, 1998, entitled "Communications Devices, Communication Systems and Methods of Communicating," now U.S. Patent No. 6,356,535.

Transaction History of related U.S. Appl. No. 09/389,534, filed Sep. 2, 1999, entitled "Remote Communication Devices, Radio Frequency Identification Devices, Wireless Communication Systems, Wireless Communication Methods, Radio Frequency Identification Device Communication Methods, and Methods of Forming a Remote Communication Device," now abandoned.

Transaction History of related U.S. Appl. No. 09/449,031, filed Nov. 24, 1999, entitled "Communications Devices, Communication Systems and Methods of Communicating," now U.S. Patent No. 6,717,923.

Transaction History of related U.S. Appl. No. 10/075,791, filed Feb. 12, 2002 entitled "Communications Systems, Communication Apparatuses, Radio Frequency Communication methods, Methods of Communicating Using a Radio Frequency Communication System, and Methods of Forming a Radio Frequency Communication Device," now U.S. Patent No. 7,075,901.

Transaction History of related U.S. Appl. No. 10/791,187, filed Mar. 1, 2004, entitled "Remote Communication Devices, Radio Frequency Identification Devices, Wireless Communication Systems, Wireless Communication Methods, Radio Frequency Identification Device Communication Methods, and Methods of Forming a Remote Communication Device."

Transaction History of related U.S. Appl. No. 11/483,198, filed Jul. 7, 2006, entitled "Communications Devices, Communication Systems and Methods of Communicating."

Transaction History of related U.S. Appl. No. 11/777,843, filed on Jul. 13, 2007, entitled "RFID Tags and Methods of Designing RFID Tags."

Transaction History of related U.S. Appl. No. 11/828,813, filed on Jul. 26, 2007, entitled "Methods and Systems of RFID Tags Using RFID Circuits and Antennas Having Unmatched Frequency Ranges."

Transaction History of related U.S. Appl. No. 11/847,611, filed Aug. 30, 2007, entitled "Remote Communication Devices, Radio Frequency Identification Devices, Wireless Communication Systems, Wireless Communication Methods, Radio Frequency Identification Device Communication Methods, and Methods of Forming a Remote Communication Device."

Transaction History of related U.S. Appl. No. 12/123,826, filed May 20, 2008, entitled "RFID Device Using Single Antenna for Multiple Resonant Frequency Ranges."

Chartered Semiconductor Manufacturing, "Toppan Announces Volume Production of Next Generation RFID Chip," press release, Jul. 8, 2003.

Sakamura, Ken, "TRON News Items for Jan. 2004," located at http://tronweb.super-nova.co.jp/tronnews04-1.html, Jan. 2004.

Tuttle, John R., U.S. Appl. No. 08/806,158, filed Feb. 25, 1997, now abandoned.

USPTO Transaction History of U.S. Appl. No. 12/123,826, entitled "RFID Device Using Single Antenna for Multiple Resonant Frequency Ranges.".

* cited by examiner

RFID DEVICES USING RFID CIRCUITS AND ANTENNAS HAVING UNMATCHED FREQUENCY RANGES

FIELD OF THE INVENTION

The present invention relates to radio frequency identification (RFID) devices using RFID circuits and antennas having unmatched frequency ranges.

BACKGROUND

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF portion of the electromagnetic spectrum is used to transmit signals.

A typical RFID system includes an antenna and a transceiver, which reads the radio frequency and transfers the information to a processing device (interrogator) and a transponder, or RFID device, which contains the RF circuitry and information to be transmitted. The antenna enables the integrated circuit to transmit its information to the interrogator that converts the radio waves reflected back from the RFID device into digital information that can then be passed on to computers that can analyze the data.

Conventional RFID devices are typically designed for use in a particular frequency range, and according to a single communication protocol. Modifying the devices to operate in additional frequency ranges, and with additional communication protocols, requires significant and costly redesign efforts.

In current EPCglobal passive device architecture, the amount of time that an RFID device can receive and transmit data per session is limited, due to the minimal amount of charge that the RFID passive device can store. In addition, the communication link between interrogator and RFID device in current RFID systems is limited in range due to constraint distance parameters of powering the RFID device.

SUMMARY

In an aspect, the present invention provides radio frequency identification (RFID) devices using RFID circuits and antennas having unmatched frequency ranges.

In general, in another aspect, the invention features an RFID system that includes an RFID interrogator having interrogator antennas. Each interrogator antenna can be tuned to different respective frequency ranges. The system also includes an RFID device having an RFID circuit, and device antennas coupled to the RFID circuit. Each RFID device antenna can be tuned to a respective frequency range that matches one of the interrogator antennas for communicating with the RFID interrogator according to respective protocols associated with each respective frequency range.

In another aspect, the invention features an RFID device including an RFID circuit, and antennas coupled to the RFID circuit. Each antenna can be tuned to a respective frequency range for communicating with at least one RFID interrogator, according to respective protocols associated with each respective frequency range.

In another aspect, the invention features an RFID interrogator including a first antenna tuned to a first frequency range for communicating with an RFID device, according to a first protocol associated with the first frequency range. The RFID interrogator also includes a second antenna tuned to a second frequency range for communicating with the RFID device, according to a second protocol associated with the second frequency range.

In another aspect, the invention provides a method that includes 1) receiving radio frequency (RF) signals having different frequency ranges on antennas tuned to the different frequency ranges, 2) selecting protocols, such that each protocol is associated with only one of the frequency ranges of the received signals, and 3) processing the received signals according to the protocols associated with the frequency ranges.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Certain terms are used throughout the following description and claims to refer to particular system components. As one skilled in the art will appreciate, design and manufacture companies may refer to a component by different names. This disclosure does not intend to distinguish between components that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean an indirect or direct connection. Thus, if a first device couples to a second device, that connection may be through a direct connection or through an indirect connection via other intermediate devices and connections. Moreover, the term "system" is understood to include "one or more components" combined together. Thus, a system can include an "entire system," "subsystems" within a system, a radio frequency identification (RFID) tag, a reader circuit, or any other devices including one or more components.

In general, various embodiments of the present invention configure RFID interrogators and devices with multiple antennas that are designed to operate at different carrier frequency ranges. A different communication protocol is utilized with each frequency range, and power can be received by RFID devices over multiple frequency ranges.

Figure 1:
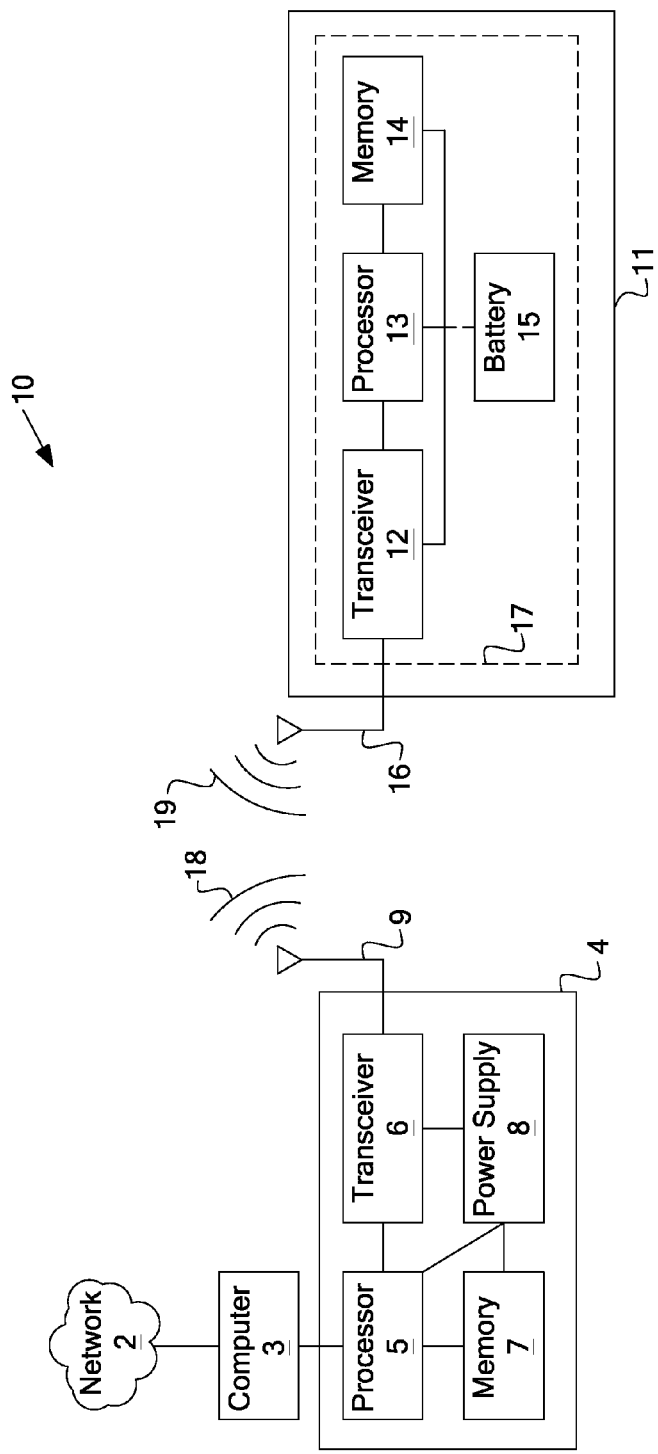
FIG. 1 is a block diagram of an RFID system linked to a network.

FIG. 1 illustrates an exemplary RFID system 10 that includes a computer 3 coupled to a network 2 and to an RFID interrogator 4. The RFID interrogator 4, which may sometimes be referred to as an RFID reader, includes a processor 5, a transceiver 6, a memory 7, a power source 8, and an antenna 9. The RFID interrogator 4 is programmable and performs transmitting and receiving to and from an RFID device with the transceiver 6 and antenna 9. Through antenna 9, the RFID interrogator 4 can communicate with one or more RFID devices 11 that are within communication range of the RFID interrogator 4. Data downloaded from an RFID device 11 can be stored in memory 7, or transferred by the processor 5 to computer 3. Thereafter, this data can be further processed or distributed to network 2.

The exemplary RFID device 11 includes device antenna 16 and RFID circuit 17. The RFID circuit 17 can include a transceiver 12, a processor 13, memory 14, and depending on whether or not RFID device 11 is active or passive, a battery 15. Any RF interrogation signal 18 transmitted by the RFID interrogator 4 to the RFID device 11 is received by the antenna 16, and passed to transceiver 12 in RFID circuit 17. When triggered by the transceiver 12, processor 13 fetches the data (e.g., time stamp, unique RFID code, and so forth) from memory 14 and transmits a return signal 19 through antenna 16 to RFID interrogator 4, as multiplexed data packets from transceiver 12.

Figure 2:
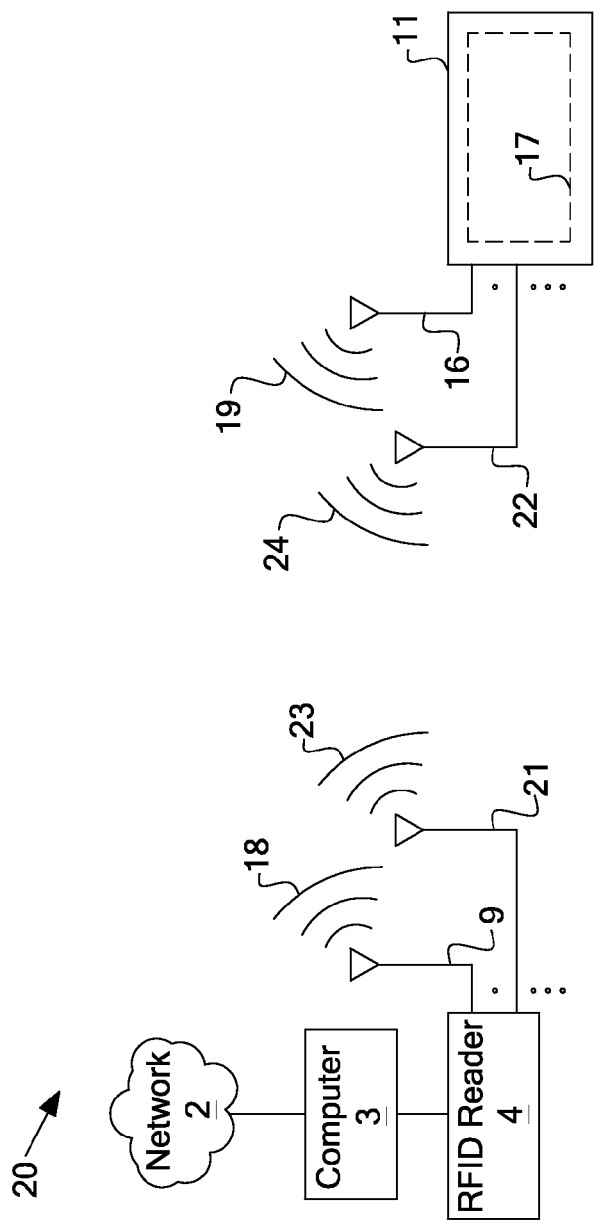
FIG. 2 is a block diagram of an exemplary RFID system.

As shown in FIG. 2, in an exemplary system 20, the interrogator 4 can be configured with multiple antennas 9, 21 that can be tuned to separate respective frequencies or frequency ranges. For example, antenna 9 may operate in a 100 MHz wide frequency range centered at 900 MHz, and antenna 21 may operate in a 100 MHz wide frequency range centered at 2.45 GHz. Likewise, the RFID device 11 can be configured with multiple corresponding antennas 16, 22. Each antenna 16, 22 on device 11 is coupled to the RFID circuit 17, and tuned to a frequency or frequency range that matches that of only one of the corresponding antennas 9, 21 on interrogator 4. For example, antenna 16 on RFID device 11 may operate in a 100 MHz wide frequency range centered at 900 MHz to correspond to antenna 9 on RFID interrogator 4, and antenna 22 on device 11 may operate in a 100 MHz wide frequency range centered at 2.45 GHz to correspond with antenna 21 on interrogator 4. Such a configuration allows the frequency range centered at 900 MHz to be utilized for communication of signals 18, 19 between antenna 9 and antenna 16. Similarly, the frequency range centered at 2.45 GHz can be utilized for communication of signals 23, 24 between antenna 21 and antenna 22.

Figure 3:
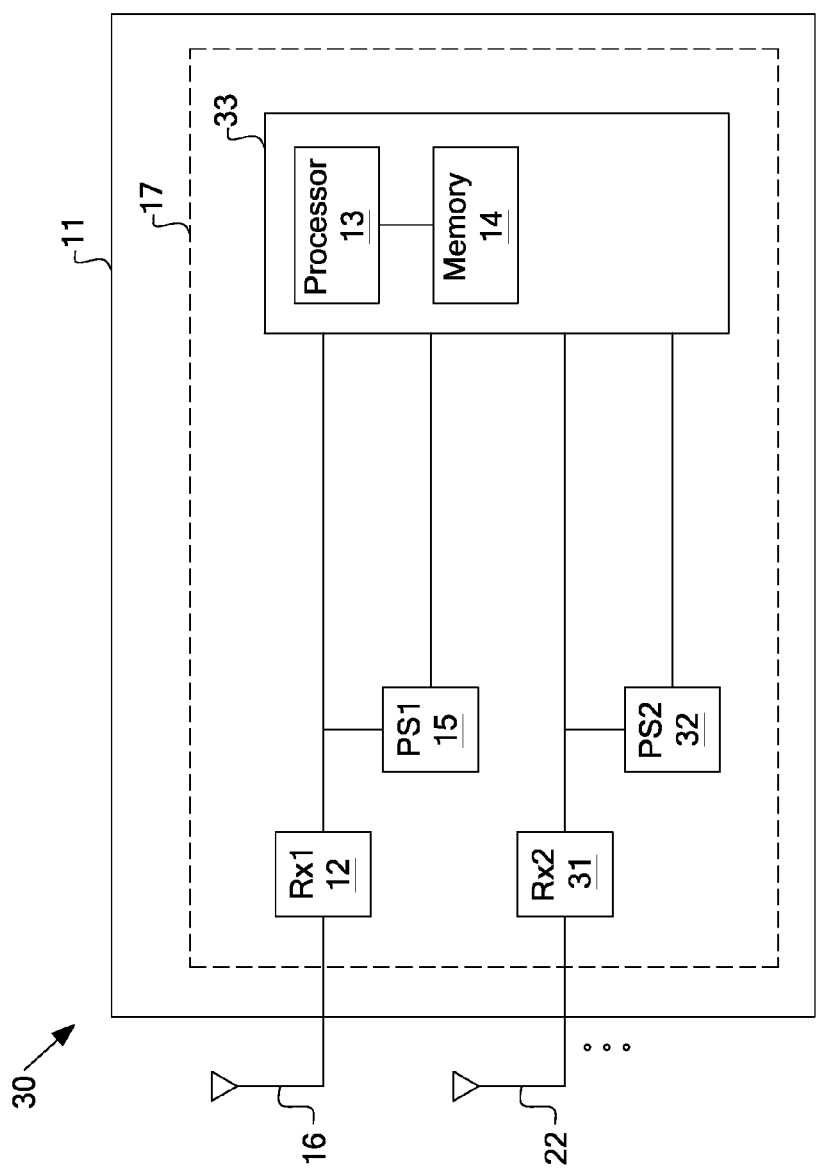
FIG. 3 is a block diagram of an exemplary RFID device.

Referring to FIG. 3, device antennas 16, 22 are connected to the RFID circuit 17, which includes respective transceivers 12, 31 and power sources 15, 32. It should be noted that instead of transceivers 12, 31, receivers such as diode detectors and transmitters can be substituted and coupled to one or both antennas 16, 22. RFID processing circuitry 33 is coupled to the transceivers 12, 31 and power sources 15, 32, and processes the signal according to respective protocols. In various embodiments, more than two antennas operating at different frequency ranges may be used on RFID device 11, and each may be similarly attached with respect to circuitry.

System 20 can also be configured to utilize a different communication protocol (e.g., EPCglobal protocol, EPC HF Class 1, EPC UHF Class 0, EPC UHF Class 1, EPC UHF Class 1 Gen 2) on each respective frequency range. Such a configuration permits the interrogator 4 and RFID device 11 to communicate simultaneously or serially over each respective frequency range. Using a different protocol on each frequency range also enables multiple interrogators to communicate simultaneously or serially at the different frequency ranges with the same RFID device 11. More specifically, using multiple protocols enables a single RFID device 11 to perform different functions. For example, an EPC UHF Class 1 protocol may be used by RFID device 11 for identification of a hospital patient, and the same RFID device 11 using an entirely different protocol (e.g., EPC HF Class 1) on a different frequency range can be used for communicating with hospital equipment, monitoring patient data, or communicating with a nurse station to report patient status at a greater distance.

As a further example, tuning or selecting antenna 9 on interrogator 4 and antenna 16 on the RFID device 11 to operate within a frequency range centered at 900 MHz, establishes a first communication link between the interrogator 4 and RFID device 11. Similarly, tuning antenna 21 on interrogator 4 and antenna 22 on the RFID device 11 to operate within a frequency range centered at 2.45 GHz, establishes a second communication link between the interrogator 4 and the RFID device 11. The 900 MHz frequency range can be used as a carrier for communications according to a first protocol, and the 2.45 GHz frequency range can be used as a carrier for communications according to a second protocol. The interrogator 4 and device 11 can communicate simultaneously or serially over the two frequency ranges.

Protocols can be associated with specific frequency ranges during the design phase of the system 20. For example, antennas 16, 22 can include filter circuits and can be connected to respective processing circuitry on RFID circuit 17 that operates within separate frequency ranges for each antenna 16, 22. Alternatively, the antennas 16, 22 can be coupled to processing circuitry on the RFID circuit 17 that determines which protocol to associate with a particular frequency range, by parsing the received signals 18, 23 for a protocol parameter indicating the protocol to be used for its associated message, data, or command. In addition, interrogator 4 may also associate protocols with frequency ranges by transmitting a command within signals 18, 23 indicating which protocol is to be used by the RFID circuit 17.

In another embodiment, the first frequency range may be used to provide power from the interrogator 4 to the RFID device 11, and the second frequency range may be used for communication according to a particular protocol. Powering the passive device 11 on the first frequency range, while simultaneously communicating over the second frequency range, has the advantage of allowing the device 11 to stay energized longer, to receive or transmit more data per session and to extend processing time.

In other embodiments, the device 11 can receive power from the interrogator 4 at multiple frequency ranges. Although the figures specifically depict interrogator 4 and device 11 as having two antennas each, many antennas operating at different frequency ranges and according to different protocols can be implemented.

It should be noted that although dipole antennas are specifically depicted in the figures, other antennas are possible, such as log periodic dipole array, triband Yagi antennas, multiple parallel antennas joined at a common feedpoint (dipoles, patches, etc.), multiple antennas connected serially, and quarter wave dipoles, monopoles and whips. In addition, some antenna designs have a primary resonance and secondary resonances, which enables the use of one antenna for multiple carrier frequencies. Multiple antennas can also be implemented as part of a single antenna structure, such as a patch antenna array.

The powering of the RFID device 11, as opposed to commands or data sent to and from the device 11, is typically the range-limiting factor in the communications link between interrogator 4 and RFID device 11. This is primarily due to free-space path loss, which tends to increase with frequency. Free-space path loss is the loss in signal strength of an electromagnetic wave that results from a line-of-sight path through free space, with no obstacles nearby to cause reflection or diffraction. Free-space power loss is proportional to the square of the distance between the transmitter and receiver, and also proportional to the square of the frequency of the radio signal. Therefore, when selecting a frequency range to power the device 11, it can be advantageous to utilize the lowest available frequency range to minimize the effects of free-space path loss and to extend the range of the device 11. Data can be sent at a higher frequency, which tends to balance the communication link.

In designing and implementing the antennas and system 20, frequency ranges are selected that are non-harmonic, non-integer multiple or non-integer-fraction frequencies relative to the other selected frequency ranges. For example, if a first frequency range is centered at 900 MHz, a subsequent frequency range should not be selected at 1800 MHz (the first harmonic of the first range). An advantage is that if multipath interference exists at the first frequency range, such interference would be very unlikely at the second. Using this configuration, reliability and range can be improved by using redundant power transmissions at multiple frequency ranges, either simultaneously or multiplexed one at a time.

In embodiments, the RFID device 11 with antennas can be implemented as part of rigid (e.g., substrate based) or flexible (e.g., RFID label) configurations. Depending on the application, printed or etched layout techniques including stripline, microstrip, organic or polymer semiconductors can be utilized for fabricating planar components or components on substrates that may be rigid or flexible.

Figure 4:
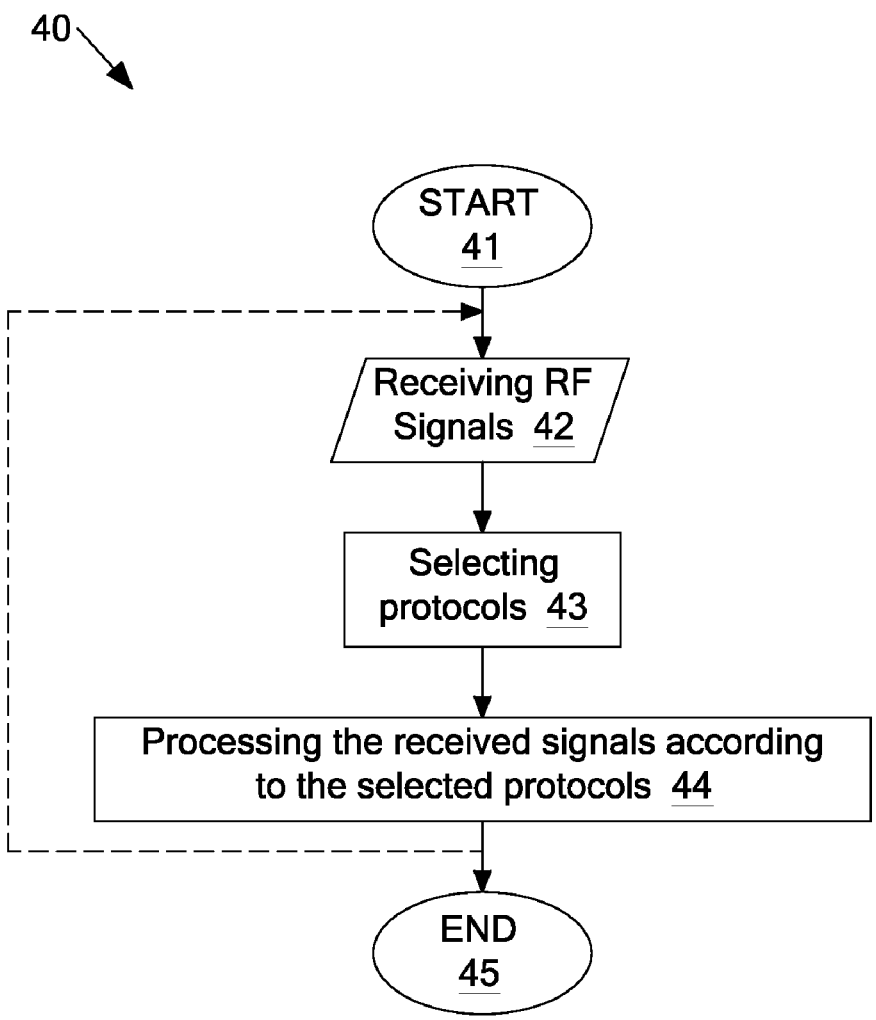
FIG. 4 is a flow diagram.
Like reference numbers and designations in the various drawings indicate like elements.

FIG. 4 illustrates a method of operation 40 of an RFID device that is in accordance with an embodiment of the present invention. The method (40) starts (41) by receiving radio frequency (RF) signals (42) having different frequency ranges on antennas tuned to the different frequency ranges. Once the signals are received, protocols are selected (43) so that each protocol is associated with only one of the frequency ranges of the received signals. The method (40) then processes (44) the received signals according to the protocols associated with the frequency ranges. Method (40) can then either end (45), or if implemented in an automated system e.g., firmware, the method (40) can proceed to step 42 and continue to repeat.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A radio frequency identification (RFID) system comprising:
   an RFID interrogator having interrogator antennas, each interrogator antenna tuned to different respective frequency ranges;
   an RFID device having an RFID circuit; and
   device antennas coupled to the RFID circuit, each device antenna tuned to a respective frequency range matching one of the interrogator antennas, for communicating with the RFID interrogator according to respective protocols associated with each respective frequency range.

2. The RFID system as set forth in claim 1, wherein the interrogator is configured to transmit power through at least one interrogator antenna to at least one of the device antennas.

3. The RFID system as set forth in claim 1, wherein each of the frequency ranges carries communications according to a respective protocol associated with the respective frequency range.

4. The RFID system as set forth in claim 1, wherein the interrogator and device communicate over each frequency range according to a protocol associated with the respective frequency range.

5. The RFID system as set forth in claim 4 wherein the interrogator and device communicate over each frequency range simultaneously.

6. The RFID system as set forth in claim 4 wherein the interrogator and device communicate over each frequency range serially.

7. The RFID system as set forth in claim 1, wherein at least one of the frequency ranges is used for communications according to the protocol corresponding to the frequency range and at least one other frequency range is used to provide power to the RFID device.

8. The RFID system as set forth in claim 7, wherein the frequency range used to provide power to the RFID device is the lowest frequency range.

9. The RFID system as set forth in claim 1, wherein each frequency range is selected to be a non-harmonic, non-integer multiple or non-integer-fraction frequency of the other frequency ranges.

10. The RFID system as set forth in claim 1 wherein the interrogator antennas and RFID device antennas are any one of dipole antennas, long periodic dipole array antennas, trib- and yagi antennas, quarter wave dipole antennas, monopole antennas, or whip antennas.

11. The RFID system as set forth in claim 1, further comprising additional RFID interrogators having interrogator antennas tuned to separate frequency ranges to permit the RFID interrogators to communicate with the RFID device at the separate frequency ranges according to respective protocols associated with each frequency range.

12. A radio frequency identification (RFID) device comprising:
   an RFID circuit; and
   antennas coupled to the RFID circuit, each antenna tuned to a separate respective frequency ranges for communicating with at least one RFID interrogator according to respective protocols associated with each respective frequency range.

13. The RFID device as set forth in claim 12, wherein at least one antenna receives a power transmission from the RFID interrogator.

14. The RFID device as set forth in claim 12, wherein each of the frequency ranges carries communications according to the respective protocol associated only with the particular frequency range.

15. The RFID device as set forth in claim 12, wherein the device communicates with the interrogator over each frequency range simultaneously.

16. The RFID device as set forth in claim 12, wherein the device communicates with the interrogator over each frequency range serially.

17. The RFID device as set forth in claim 12, wherein at least one of the frequency ranges is used for communications according to the protocol corresponding to the frequency range and at least one other frequency range is used to simultaneously receive power from the interrogator.

18. The RFID device as set forth in claim 17, wherein the frequency range used to receive power from the interrogator is the lowest frequency range.

19. The RFID device as set forth in claim 12, wherein each frequency range is selected to be a non-harmonic, non-integer multiple or non-integer fraction frequency of the other frequency ranges.

20. A radio frequency identification (RFID) interrogator comprising:
   a first antenna tuned to a first frequency range for communicating with an RFID device according to a first protocol associated with the first frequency range; and
   a second antenna tuned to a second frequency range for communicating with the RFID device according to a second protocol associated with the second frequency range.

21. The RFID interrogator as set forth in claim 20, further comprising additional antennas, each tuned to respective frequency ranges for communicating with the RFID device according to respective protocols associated with the respective frequency ranges.

22. The RFID interrogator as set forth in claim 21, wherein at least one of the antennas transmits power to the RFID device.

23. A method comprising:
   receiving radio frequency (RF) signals having different frequency ranges on separate antennas tuned to the different frequency ranges;
   selecting protocols, each protocol associated with one of the separate frequency ranges of the received signals;
   processing the received signals according to the protocols associated with the frequency ranges; and
   communicating with an RFID interrogator over each frequency range according to the protocols associated with the respective frequency range.

* * * * *